(12) United States Patent
Garber

(10) Patent No.: US 8,740,480 B2
(45) Date of Patent: Jun. 3, 2014

(54) LENS CAP WITH INTEGRATED STORAGE MECHANISM

(71) Applicant: Michael Garber, Atlanta, GA (US)

(72) Inventor: Michael Garber, Atlanta, GA (US)

(*) Notice: Subject to any disclaimer, the term of this patent is extended or adjusted under 35 U.S.C. 154(b) by 0 days.

(21) Appl. No.: 13/925,446

(22) Filed: Jun. 24, 2013

(65) Prior Publication Data

US 2013/0287387 A1    Oct. 31, 2013

(51) Int. Cl.
*G03B 17/00* (2006.01)
(52) U.S. Cl.
USPC .......................................... 396/448; 359/511
(58) Field of Classification Search
USPC ............................ 396/448, 544; 359/507, 511
See application file for complete search history.

(56) References Cited

U.S. PATENT DOCUMENTS

| | | | | |
|---|---|---|---|---|
| 5,040,011 | A * | 8/1991 | Tiffen | 396/544 |
| 5,224,773 | A * | 7/1993 | Arimura | 362/227 |
| 7,682,091 | B2 * | 3/2010 | Zeck | 396/448 |
| 2012/0281977 | A1 * | 11/2012 | Stevenson | 396/544 |

OTHER PUBLICATIONS

ISO 1222 Photography—Tripod connections (2010) (accessed Jun. 20, 2013).
Thingverse website: Lens cap holder screwed to camera bottom (accessed Jun. 20, 2013).
Kickstarter website: Stow-Away Lens Cap Holder for your SLR camera! (accessed Jun. 20, 2013).
FStopper website: The Stow-Away Lens Cap Holder (accessed Jun. 20, 2013).
Wikipedia website: Tripod (photography) (accessed Jun. 20, 2013).
PetaPixel Website: Nikon Patents a Simple Way to Attach Your Lens Cap to Your Strap (accessed Jun. 24, 2013).
Nikon Rumors website: Two new patents from Nikon (accessed Jun. 24, 2013).
The Shapeways Blog: 3D Printing News & Innovation (accessed Jun. 24, 2013).
Hrishikesh Kogje, "Clasp lenscap concept", website accessed at http://www.coroflot.com/hrishikeshkogje/Clasp-lenscap-concept on Oct. 31, 2013; website states publication date of Feb. 23, 2013.

* cited by examiner

*Primary Examiner* — Clayton E Laballe
*Assistant Examiner* — Warren K Fenwick
(74) *Attorney, Agent, or Firm* — Koffsky LLC; Mark I. Koffsky

(57) ABSTRACT

Described is a lens cap with an integrated threaded screw that allows the cap to be stored on the camera securely without the use of any additional hardware. In one embodiment, a standard camera lens cap has a screw as found on standard male tripod mounts protruding from the front of the lens cap. When the camera is in use, the screw protruding from the lens cap may be used to secure the lens cap to the threaded female tripod mount found on the underside of most cameras.

22 Claims, 4 Drawing Sheets

LENS CAP WITH INTEGRATED STORAGE MECHANISM

FIELD OF THE DISCLOSURE

The present disclosure relates to the field of camera lens caps. More specifically, the disclosure comprises a lens cap that has a bolt for storing the lens cap under the camera when the camera is in use.

BACKGROUND

Lens caps are needed in the photographic arts to protect lenses when the camera is not in use. The cap must be removed from the lens in order to capture images on the camera. Lens caps come in many sizes to accommodate the variety of lens diameters they are designed to protect. The marketplace currently includes over 50 sizes of lens caps. Because of the spontaneous nature of photography, a user must remove a lens cap at a moment's notice in order to capture the perfect shot. This often leads to lens caps being misplaced in the rush to capture the photo.

There are many known devices for storing the lens cap in a convenient and consistent location so that the photographer does not have search for where they placed it after they finish shooting. Such devices may consist of clips, screws, fasteners, strings or other securing methods that mount on a camera strap, on a camera user, or on the camera itself. For example, one such device attaches to a camera strap and has an integral clip to securely hold a lens cap when the lens cap is removed from the lens. Other examples use the lens caps clips or male threads to allow it to clip in to a holder with complimentary female threading.

The disadvantage of these systems is that they all require an extraneous device in addition to a lens cap and the camera. This additional device is inconvenient for those already carrying a camera, lens caps, lenses, straps and other accessories. Furthermore, many of these systems can only hold one size of cap or are excessively bulky in order to accommodate multiple sizes of lens caps. Other systems do not secure the lens cap well enough to assure that the cap will not be misplaced. Every one of these systems is limited by the fact that they all require a specific camera configuration including certain limiting elements (i.e. a camera strap, specific lens diameter, etc.).

Accordingly, there is a need for a lens cap with integrated hardware that allows it to be stored securely without the use of any additional extraneous devices and allows it to work with any camera and lens configuration on the market.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
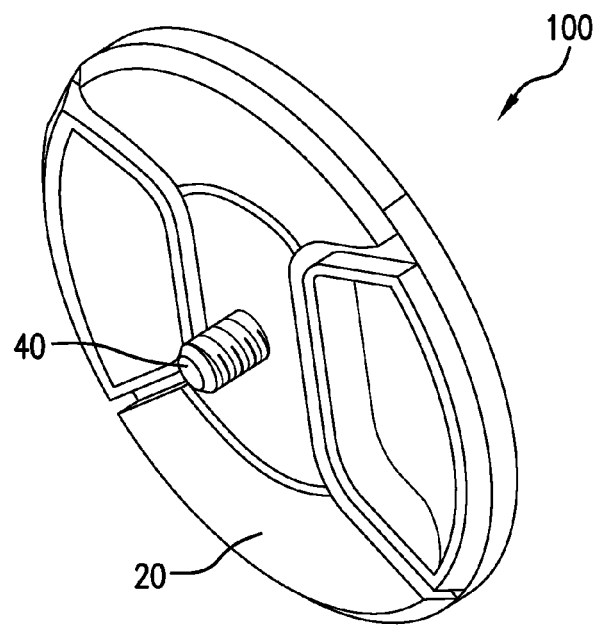
FIG. 1 shows an isometric view of a lens cap having a fixed bolt in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure is directed to a lens cap with an integral threaded bolt that allows the cap to be stored on the camera securely without the use of any additional hardware. In one embodiment, a standard camera lens cap has a bolt protruding from the front of the lens cap. When the camera is in use, the bolt protruding from the lens cap may be used to secure the lens cap to the threaded tripod nut found on the underside of most cameras.

Turning to FIG. 1, shown is an isometric view of a lens cap 100. The lens cap 100 includes a lens cap body 20 and the integrated lens cap bolt 40 having a shank protruding from the front of the lens cap body 20.

Figure 2:
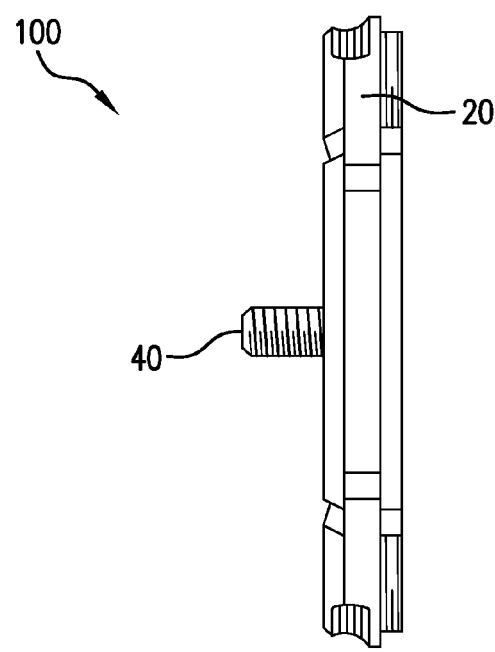
FIG. 2 shows a side view of a lens cap having a fixed bolt in accordance with some embodiments.

Turning to FIG. 2, shown is a side view of the lens cap 100. This view shows the lens cap body 20 and the integrated lens cap bolt 40. The lens cap body 20 and lens cap bolt 40 may each be made of metal, plastic, rubber or other material.

In some embodiments, the lens cap bolt 40 may be a ¼ inch 20 UNC threaded bolt. This refers to an American Standard unified course thread bolt of diameter ¼ inch width with 20 threads per inch. The embodiment may also follow the ISO 1222 (2010) standard. This may include: (i) a bolt height of 4.5 mm with a tolerance of 0.2 mm; (ii) a tapered top section of the bolt with a height less than 1.3 mm; (iii) a tapered top section of the bolt and a full middle section of the bolt with a combined height of more than 3.5 mm but less than 4.5 mm with a tolerance of 0.2 mm; (iv) a pitch of 1.27 mm for each bolt thread; (v) a major diameter of 6.350 mm with an upper deviation of −0.028 mm and lower deviation of −0.338 mm and a tolerance of 0.310 mm; (vi) a pitch diameter of 5.525 mm with an upper deviation of −0.028 mm, lower deviation of −0.170 mm and a tolerance of 0.142 mm; and (vii) a minor diameter of 4.975 mm with an upper deviation of −0.212 mm.

In some embodiments the lens cap bolt 40 may be a ⅜ inch 16 UNC threaded bolt. This refers to an American Standard unified course thread bolt of diameter ⅜ inch width with 16 threads per inch. The embodiment may also follow the ISO 1222 (2010) standard. This may include: (i) a bolt height of 4.5 mm with a tolerance of 0.2 mm; (ii) a tapered top section of the bolt with a height less than 1.3 mm; (iii) a tapered top section of the bolt and a full middle section of the bolt with a combined height of more than 3.5 mm but less than 4.5 mm with a tolerance of 0.2 mm; (iv) a pitch of 1.588 mm for each bolt thread; (v) a major diameter of 9.525 mm with an upper deviation of −0.033 mm and lower deviation of −0.393 mm and a tolerance of 0.360 mm; (vi) a pitch diameter of 8.494 mm with an upper deviation of −0.033 mm, lower deviation of −0.199 mm and a tolerance of 0.166 mm; and (vii) a minor diameter of 7.806 mm with an upper deviation of −0.262 mm.

Figure 3:
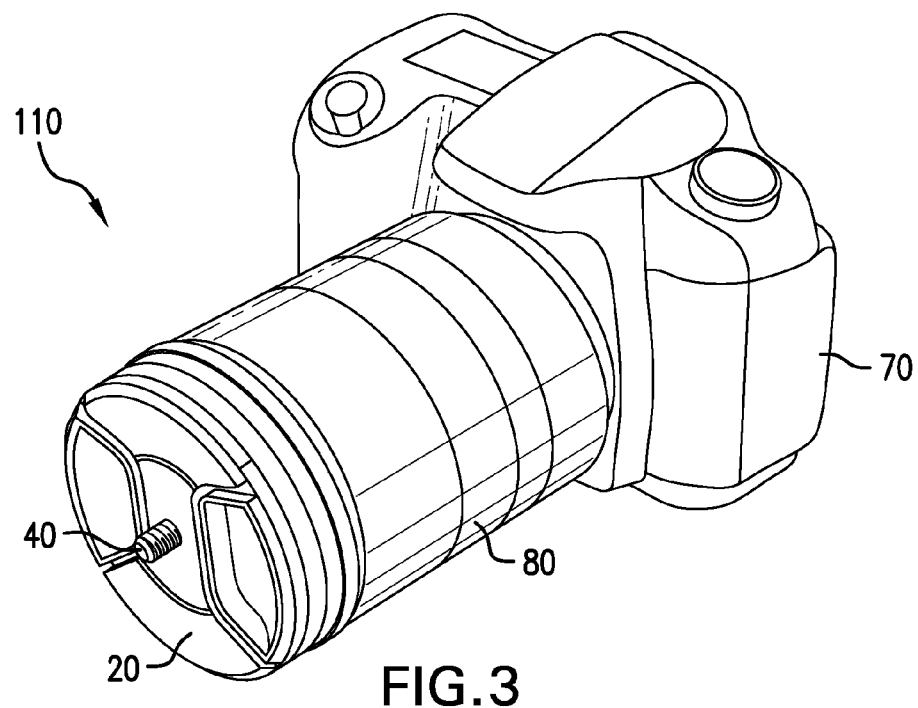
FIG. 3 shows a lens cap having a fixed bolt mounted on the camera lens in standard fashion to protect the lens in accordance with some embodiments.

Turning to FIG. 3, shown is a camera assembly with a lens cap installed in protective mode 110 for when the camera 70 is not in use. The lens cap body 20 is installed as normal on the camera lens 80 leaving the lens cap bolt 40 protruding outwardly from the camera lens 80 so that it does not interfere with the camera lens 80.

Figure 4:
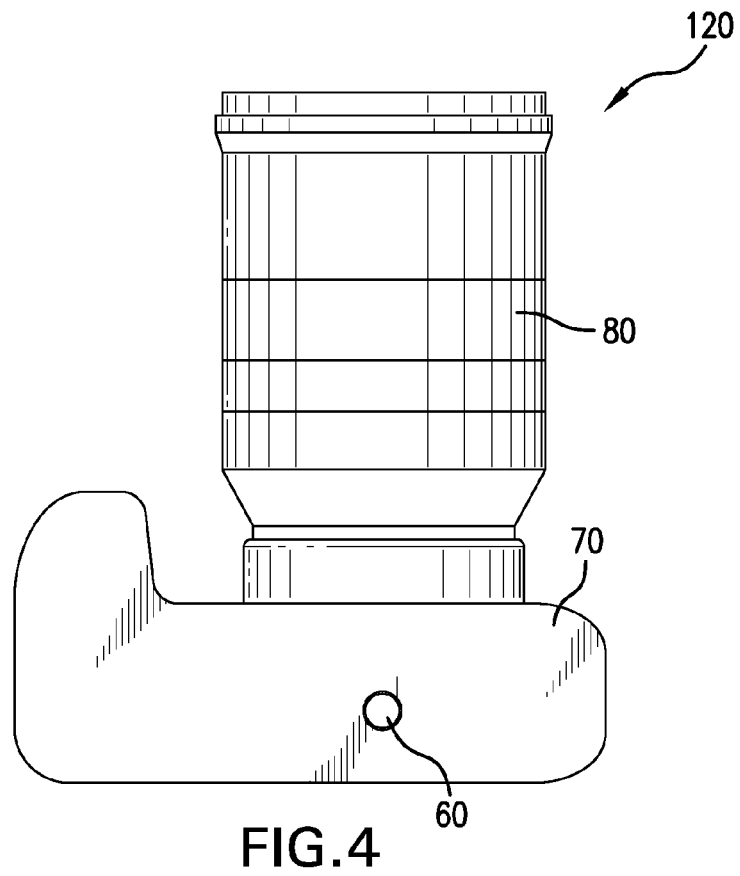
FIG. 4 shows an empty threaded tripod nut located on the bottom of certain cameras in accordance with some embodiments.

Turning to FIG. 4, shown is a bottom view of a camera assembly with no lens cap installed 120. Shown is the bottom view of the camera body 70 and camera lens 80 and the tripod nut 60 that may be integrated into the camera body 70.

In some embodiments, the tripod nut 60 may be constructed to receive a ¼ inch 20 UNC threaded bolt. The embodiment may also follow the ISO 1222 (2010) standard. This may include: (i) a nut height greater than 5.5 mm; (ii) an expanded top section of the nut; (iii) a full middle section of the nut and an expanded bottom section of the nut with a combined height of more than 4 mm; (iv) an expanded bottom section of the nut with a height of less than 1 mm; (v) a pitch of 1.27 mm for each bolt thread; (vi) a major diameter of 6.350 mm with a lower deviation of +0.110 mm; (vii) a pitch diameter of 5.525 mm with an upper deviation of +0.295 mm, lower deviation of +0.110 mm and a tolerance of 0.185 mm; and (viii) a minor diameter of 4.975 mm with an upper deviation of +0.292 mm and tolerance of 0.292 mm.

In some embodiments the tripod nut 60 may be constructed to receive a ⅜ inch 16 UNC threaded bolt. The embodiment may also follow the ISO 1222 (2010) standard. This may include: (i) a nut height greater than 5.5 mm; (ii) an expanded top section of the nut; (iii) a full middle section of the nut and an expanded bottom section of the nut with a combined height of more than 4 mm; (iv) an expanded bottom section of the nut with a height of less than 1 mm; (v) a pitch of 1.588 mm for each bolt thread; (vi) a major diameter of 9.525 mm with a lower deviation of +0.150 mm; (vii) a pitch diameter of 8.494 mm with an upper deviation of +0.366 mm, lower deviation of +0.150 mm and a tolerance of 0.216 mm; and (viii) a minor diameter of 7.806 mm with an upper deviation of +0.357 mm and tolerance of 0.357 mm.

Figure 5:
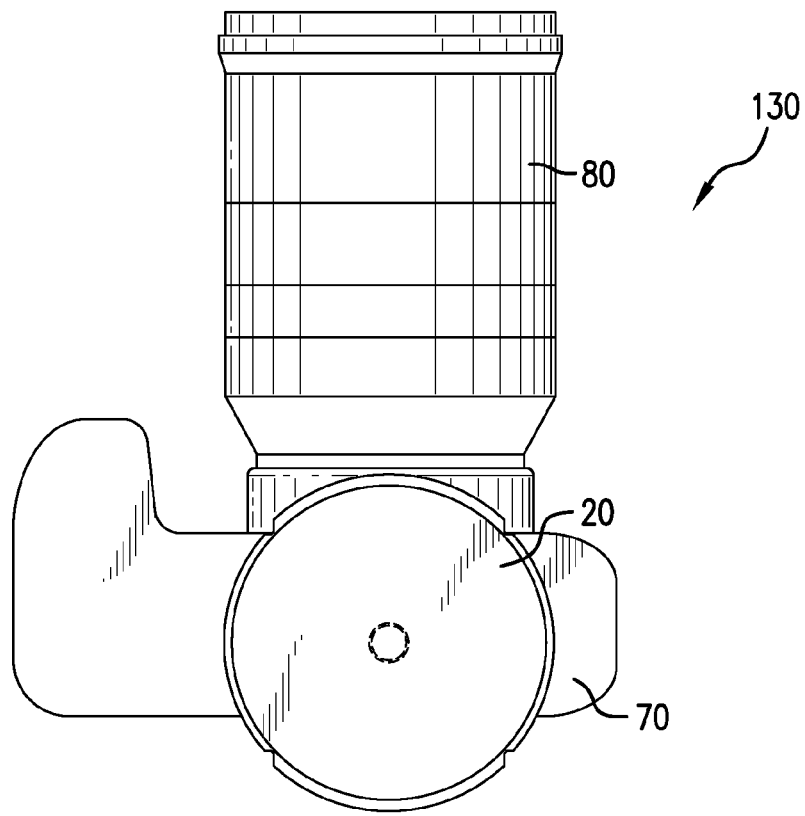
FIG. 5 shows a lens cap mounted onto the threaded tripod nut located on the bottom of certain cameras in accordance with some embodiments.

Turning to FIG. 5, shown is a bottom view of the camera assembly with a lens cap installed in stored mode 130. In one embodiment, the lens cap body 20 is secured to the camera 70 by screwing the lens cap bolt 40 into the tripod nut 60 (not shown). In another embodiment, friction between the top of the lens cap body 20 and the bottom of the camera 70 stops the lens cap body 20 from accidentally being unscrewed. In another embodiment, friction keeps the lens cap bolt 40 in place in the tripod nut 60. In another embodiment, the lens cap bolt 40 is made of rubber or other similar material and are held by friction in the tripod nut 60 in a manner similar to a rubber stopper.

Figure 6:
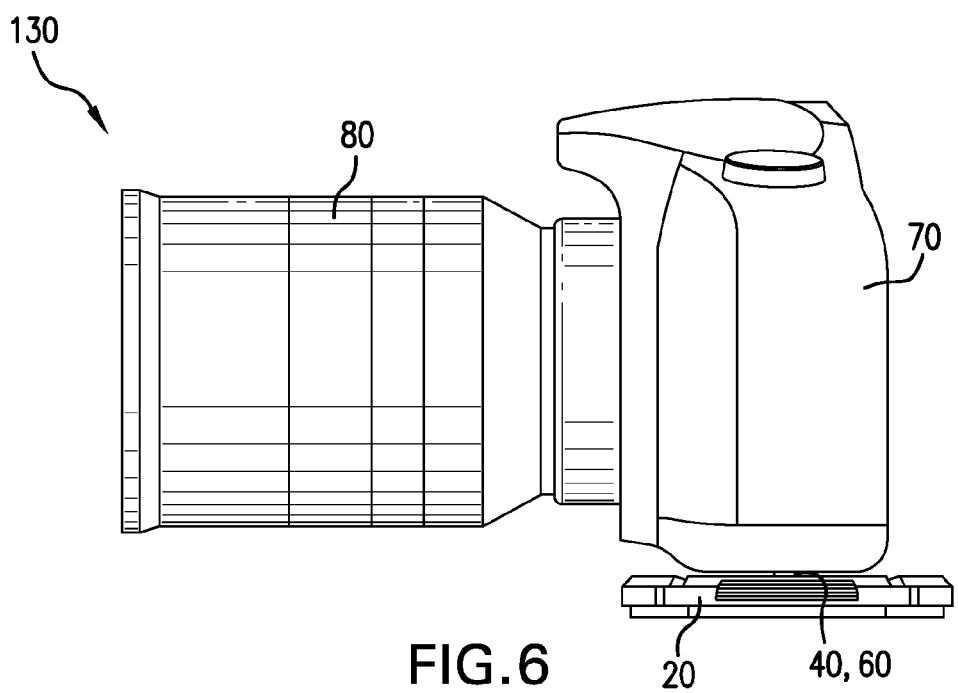
FIG. 6 shows a side view of certain cameras with a lens cap mounted onto the threaded tripod nut located on the bottom of the camera in accordance with some embodiments.

Turning to FIG. 6, shown is a side view of the camera assembly with a lens cap installed in stored mode 130. The lens cap body 20 is secured to the camera 70 by screwing the lens cap bolt 40 into the tripod nut 60.

A lens cap may include male threads on the outside rim of the cap. These male threads are designed to mate with female threads on a lens when the lens cap is installed. In some lens caps, there may be additional moving sections that are mechanically engaged with springs within the lens cap body. In the "default mode," the moving sections and springs within the cap are arranged so that the sections of the rim of the lens cap with the male threads jut out from the rest of the rim. This allows a strong interlocking with the female threads of the lens to be achieved. In the "compressed mode," pressure is put on the springs and moving sections within the cap so that the sections of the rim of the lens cap with the male threads no longer jut out from the rest of the rim. In this compressed mode, the lens cap may be easily inserted into, or removed from, the female threads of the lens. Once the pressure is released, the lens cap returns to the default mode and the male lens cap threads mate with the female lens threads, thus locking the lens cap in place. The moving sections of the lens cap may be activated by pinching tabs in the body of the cap toward the center of the cap that are integral to the moving sections (a pinch-type cap), squeezing the moving sections on the rim itself (a squeeze-type cap), or by other mechanical action.

Figure 7:
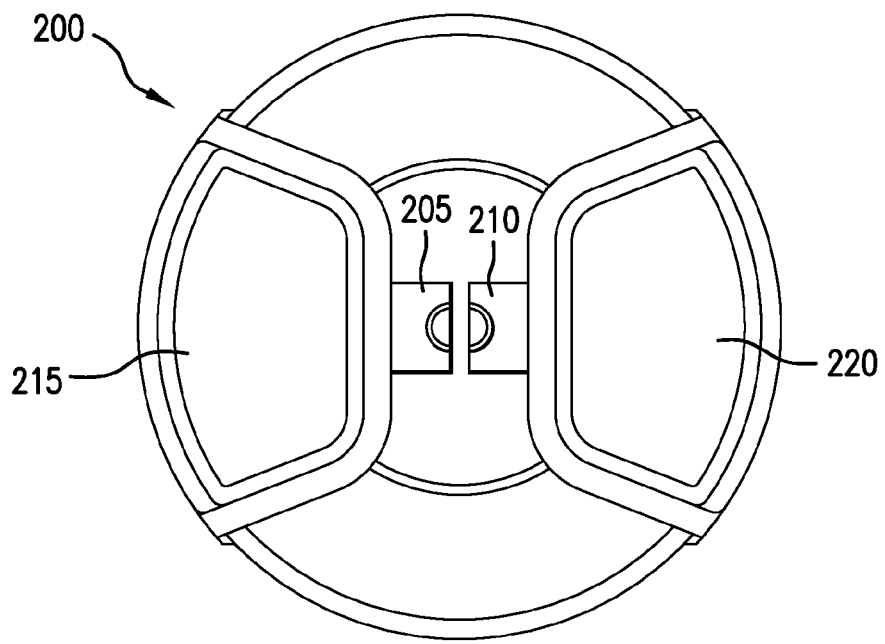
FIG. 7 shows a top view of a lens cap having a compressible split bolt in the default position in accordance with some embodiments.

Turning to FIG. 7, shown is a top view of an embodiment of a lens cap 200 in the default mode having an integrated movable split bolt. The split bolt is divided into two halves 205, 210. Each half of the split bolt 205, 210 may include a shank in the shape of a hemi-cylinder (that is when compressed together along their shanks so that the flat faces move toward each other, the split bolts 205, 210 form the approximate shape of a cylindrical un-split bolt). Each half of the split bolt 205, 210 is mechanically connected to one of the movable sections 215, 220 so that the halves are separated when the lens cap is in default mode. The lens cap may be a pinch-type or squeeze-type. The lens cap and split bolt halves may be made of metal, plastic, rubber or other materials.

Figure 8:
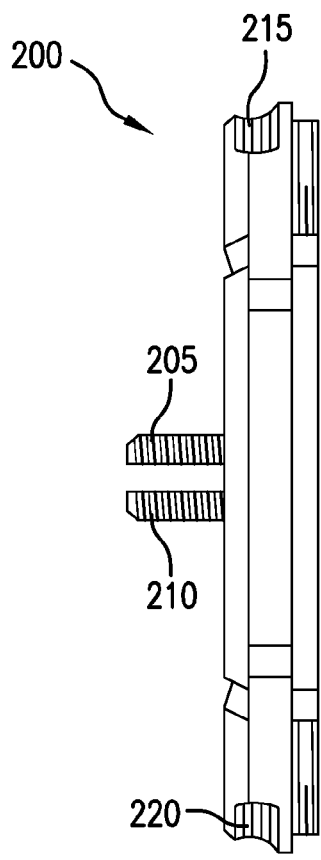
FIG. 8 shows a side view of a lens cap having a compressible split bolt in the default position in accordance with some embodiments.

Turning to FIG. 8, shown is a side view of an embodiment of a lens cap 200 in the default mode having an integrated movable split bolt. The split bolt is divided into two sections 205, 210. Each section of the split bolt 205, 210 is mechanically connected to one of the movable sections 215, 220 so that the halves are separated when the lens cap is in default mode.

Figure 9:
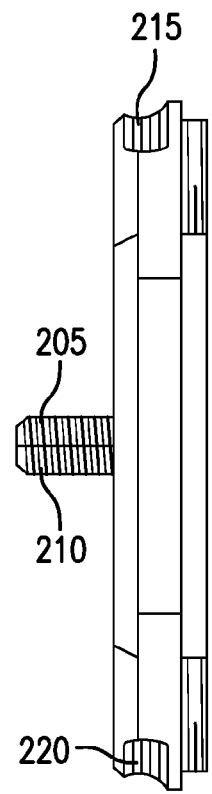
FIG. 9 shows a side view of a lens cap having a compressible split bolt in the compressed position in accordance with some embodiments.

Turning to FIG. 9, shown is a side view of another embodiment of a lens cap 200 having an integrated movable split bolt. The lens cap is in compressed mode. The split bolt is divided into two sections 205, 210. Each section of the split bolt 205, 210 is mechanically connected to one of the movable sections 215, 220 so that the sections are touching or nearly touching when the lens cap is in compressed mode.

When in the compressed mode, the split bolt halves 205, 210 may take a similar form factor and perform similar functions as the lens cap bolt 40 discussed in embodiments above. Or the split bolt halves may operate differently. Some differences may include: instead of screwing the split bolt halves 205, 210 into the tripod nut 60, the split bolt halves 205, 210 are inserted linearly into the tripod nut 60 when the lens cap 200 is in compressed mode. When the lens cap 200 returns to default mode, the threads of the split bolt halves 205, 210 separate to form a strong interlocking with the threads of the tripod nut 60. When the lens cap 200 is again placed in compressed mode, the split bolt halves 205, 210 come together and allow easy removal of the lens cap 200 from the tripod nut 60 in a linear motion without the necessity of rotating the threaded split bolt halves 205, 210 out of the tripod nut 60 as in the embodiment requiring a fixed lens cap bolt 40.

In another embodiment, the split bolt halves 205, 210 may be unthreaded and retain the lens cap body 20 in the tripod nut 60 through the use of friction in default mode. In another embodiment, the split bolt halves 205, 210 are made of rubber or other similar material and is held by friction in the tripod nut 60 in a manner similar to a rubber stopper.

As discussed above, these embodiments eliminate the problem of lost lens caps by redesigning the lens cap correctly. The new lens cap works with any camera, in any camera configuration (i.e. strapped/strapless), with any diameter lens, and does not require the purchase of any additional hardware since it would replace the current cap included in the initial purchase of the lens/camera. This new lens cap has a significant benefit over the prior art solutions that require extra hardware or extraneous devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. An apparatus comprising:
    a lens cap having a front portion, a rear portion and a rim, wherein the rear portion of the lens cap is capable of being secured to a camera lens; and
    a bolt having a shank and secured in the lens cap so that the shank protrudes from the front portion of the lens cap.

2. The apparatus as in claim 1, wherein the shank protrudes from the approximate center of the front portion of the lens cap.

3. The apparatus as in claim 2, wherein the shank includes threads on the shank.

4. The apparatus as in claim 3, wherein the bolt is a ¼ inch 20 UNC threaded bolt.

5. The apparatus as in claim 3, wherein the bolt is a ⅜ inch 16 UNC threaded bolt.

6. The apparatus as in claim 3, wherein when the lens caps is screwed into a tripod nut integrated with a camera, the front portion of the lens cap is secured to the camera by friction.

7. The apparatus as in claim 3, wherein the rim further comprises a plurality of rim portions having threads thereon.

8. The apparatus as in claim 7, wherein the plurality of rim portions having threads thereon protrude from the circumference of the rest of the rim when the plurality of rim portions having threads thereon are not compressed.

9. The apparatus as in claim 8, wherein each of the plurality of rim portions having threads thereon is movable during a compression action so as to substantially match the circumference of the rest of the rim.

10. The apparatus as in claim 9, wherein the compression action comprises a squeezing action.

11. The apparatus as in claim 9, wherein the compression action comprises a pinching action.

12. An apparatus comprising:
    a lens cap having a front portion, a rear portion and a rim;
    a first bolt having a first hemi-cylindrical shank and secured in the lens cap so that the first hemi-cylindrical shank protrudes from the front portion of the lens cap; and
    a second bolt having a second hemi-cylindrical shank and secured in the lens cap so that the second hemi-cylindrical shank protrudes from the front portion of the lens cap.

13. The apparatus as in claim 12, wherein the point in between where the first hemi-cylindrical shank emerges from the front portion of the lens cap and second hemi-cylindrical shank emerges from the front portion of the lens cap is the approximate center of the front portion of the lens cap.

14. The apparatus as in claim 13, wherein the first hemi-cylindrical shank includes threads on a portion of the first hemi-cylindrical shank and the second hemi-cylindrical shank includes threads on a portion of the second hemi-cylindrical shank.

15. The apparatus as in claim 14, wherein when the first bolt and the second bolt are compressed together, they comprise approximately a ¼ inch 20 UNC threaded bolt.

16. The apparatus as in claim 14, wherein when the first bolt and the second bolt are compressed together, they comprise approximately a 3/8 inch 16 UNC threaded bolt.

17. The apparatus as in claim 14, wherein when the lens caps is screwed into a tripod nut integrated with a camera, the front portion of the lens cap is secured to the camera by friction.

18. The apparatus as in claim 14, wherein the rim further comprises a first rim portion with first threads thereon and a second rim portion with second threads thereon.

19. The apparatus as in claim 18, wherein the first rim portion and the second rim portion protrude from the circumference of the rest of the rim when not compressed.

20. The apparatus as in claim 19, wherein the first rim portion is movable during a first compression action so as to substantially match the circumference of the rest of the rim, and wherein the first rim portion and the first hemi-cylindrical shank are mechanically connected so that the first compression action also moves the first hemi-cylindrical shank closer to the second hemi-cylindrical shank; and wherein the second rim portion is movable during a second compression action so as to substantially match the circumference of the rest of the rim, and wherein the second rim portion and the second hemi-cylindrical shank are mechanically connected so that the second compression action also moves the second hemi-cylindrical shank closer to the first hemi-cylindrical shank.

21. The apparatus as in claim 20, wherein the first compression action and the second compression action comprise a squeezing action.

22. The apparatus as in claim 20, wherein the first compression action and the second compression action comprise a pinching action.

* * * * *